US008271656B2

(12) United States Patent
Steiner et al.

(10) Patent No.: US 8,271,656 B2
(45) Date of Patent: Sep. 18, 2012

(54) DECREASING LATENCY IN ANONYMITY NETWORKS

(75) Inventors: Moritz Steiner, Red Bank, NJ (US); Ivica Rimac, Tinton Falls, NJ (US); Volker Hilt, Middletown, NJ (US); Prithula Dhungel, Brooklyn, NY (US)

(73) Assignee: Alcatel Lucent, Paris (FR)

( * ) Notice: Subject to any disclaimer, the term of this patent is extended or adjusted under 35 U.S.C. 154(b) by 318 days.

(21) Appl. No.: 12/662,798

(22) Filed: May 4, 2010

(65) Prior Publication Data
US 2011/0276718 A1 Nov. 10, 2011

(51) Int. Cl.
*G06F 15/16* (2006.01)
*G06F 15/173* (2006.01)

(52) U.S. Cl. ........ 709/226; 709/219; 709/223; 709/224; 709/238

(58) Field of Classification Search .................. 709/206, 709/209, 221, 238; 370/400
See application file for complete search history.

(56) References Cited

U.S. PATENT DOCUMENTS

| 6,453,341 | B1 * | 9/2002 | Miloslavsky | 709/206 |
| 6,581,105 | B2 * | 6/2003 | Miloslavsky et al. | 709/238 |
| 6,732,156 | B2 * | 5/2004 | Miloslavsky | 709/206 |
| 7,009,987 | B1 * | 3/2006 | Matsuzawa et al. | 709/238 |
| 7,206,315 | B2 * | 4/2007 | Matsuzawa et al. | 709/238 |
| 7,751,327 | B2 * | 7/2010 | Karino et al. | 709/209 |
| 7,796,607 | B2 * | 9/2010 | Gerber et al. | 709/238 |
| 8,089,905 | B2 * | 1/2012 | Umeshima | 709/221 |
| 2006/0109853 | A1 * | 5/2006 | Matsuzawa et al. | 370/400 |

OTHER PUBLICATIONS

*Tor: anonymity online*; http://www.torproject.org/; (5 pages).
Panchenko, et al.; *Path Selection Metrics for Performance-Improved Onion Routing* (7 pages).
Dingledine, et al.; *Performance Improvments on Tor or, Why Tor is Slow and What we're going to do about it*. Mar. 11, 2009. (27 pages).
Sherr, et al.; *Towards Application-Aware Anonymous Routing*; University of Pennsylvania. (5 pages).
Dabek, et al.; *Vivaldi: A Decentralized Network Coordinate System*; Cambridge, Massachusetts (12 pages).
Dhungel, et al.; *Waiting for Anonymity: Understanding Delays in Tor*; Polytechnic Institute of NYU, Brooklyn, NY and Bell Labs/Alcatel-Lucent, Holmdel, NJ. (5 pages).
Kiesel, et al.; *Application-Layer Tragic Optimization (ALTO) Requirement*; http://tools.ietf.org/html/draft-ietf-alto-reqs-01; (26 pages).

* cited by examiner

*Primary Examiner* — Quang N. Nguyen
(74) *Attorney, Agent, or Firm* — Harness, Dickey & Pierce

(57) ABSTRACT

According to one embodiment, a method of decreasing latency in an anonymity network includes filtering a list of anonymity routers for a client device based on one of (i) loads of the anonymity routers on the list and (ii) distances of the anonymity routers from the client device.

11 Claims, 4 Drawing Sheets

DECREASING LATENCY IN ANONYMITY NETWORKS

BACKGROUND

In the today's Internet, any web server receiving a request from a user logs the IP address of this user. This way, the owner of the web server knows who has looked at which web sites and at what time. The user is not anonymous to the web site. Moreover, the Internet provider of the user may use techniques such as web proxy servers or deep packet inspection to log which web sites a particular user visits. In both cases an anonymity network, also called overlay and onion networks, might bring anonymity to the user.

In these networks, a user's request is routed through several Internet hosts participating in the anonymization network in such a way that the web server does not know where the request originates from, and the Internet service provider of the user does not know to where the request goes.

FIG. 1 illustrates an example of a conventional anonymization network. A portion of the Internet including a plurality of routers 10 and 15 is shown. Of the plurality of routers 10 and 15, some of the routers, routers 15, run an anonymization service, and may act as anonymity routers 15 and form an anonymization network. These anonymity routers 15 are illustrated with a plus sign.

Operation of the conventional anonymization network will be described with respect to a client device 20 communicating with a destination device 40 via the anonymization network. In operation, a client or user device 20 running an anonymization client (e.g., software) obtains a list of anonymity routers 15 from a directory server 30. The directory server 30 maintains a list of active anonymity routers. The anonymization client on the user device 20 (hereinafter collectively referred to as the "client 20") builds a path of connections through a plurality of anonymity routers 15. In particular, a first anonymity router 15 is randomly selected from the obtained list, and the client 20 negotiates a set of encryption keys for this connection or hop. A second anonymity router 15 is then randomly selected from the obtained list, and the client 20 negotiates a set of encryption keys for the connection or hop from the first anonymity router 15 to the second anonymity router 15. This process is repeated a number of times to build the pathway or circuit through the anonymization network.

The final anonymity router 15 in the pathway is given the address (e.g., URL) of the destination device 40. As shown, traffic sent between the client 20 and the destination device 40 traverses a number of encrypted hops. In FIG. 1, each encrypted hop is shown by a solid double headed arrow, and each unencrypted hop is shown by a dashed double headed arrow.

Because traffic traverses a number of encrypted hops, the destination device 40 (e.g., a web server) and Internet service providers are unable to properly determine the IP address of the client 20 or the web sites visited by the client 20. However, this anonymity does not come without a cost. The use of anonymization networks introduces a degree of latency that can affect the quality of Internet usage at the client 20.

SUMMARY

The present invention relates to decreasing latency in anonymization networks.

According to one embodiment, a method of decreasing latency in an anonymity network includes filtering a list of anonymity routers for a client device based on one of (i) loads of the anonymity routers on the list and (ii) distances of the anonymity routers from the client device.

For example, in one embodiment, the filtering step filters the list based on distances of the anonymity routers from the client device. Here the filtering step may include sending the list to one of a distance and a location based service. The service monitors one of distance and location of the anonymity routers. A reordered list is received from the service, and the reordered list orders the anonymity routers based on distance from the client device. Traffic may then be routed from the client device to a destination using a number of anonymity routers closest to the client device as indicated by the reordered list.

As an alternative, an adjusted list may be produced from a number of the closest anonymity routers on the reordered list, and traffic is routed from the client device using anonymity routers from the adjusted list.

In another embodiment, the filtering step filters the obtained list based on loads of the anonymity routers. For example, the filtering step may include sending an operating system layer message and an application layer message to a number of the anonymity routers on the obtained list, determining, for each of the number of the anonymity routers, a difference between a response time to the operating system layer message and a response time to the application layer message, and forming a filtered list excluding anonymity routers from the list having a determined difference greater than a threshold. Traffic may then be routed from the client device using anonymity routers from the filtered list.

In another embodiment, the list includes a load metric associated with each anonymity router, and the load metric indicates a load on the associated anonymity router. The filtering step includes forming a filtered list excluding anonymity routers from the list with associated load metrics greater than a threshold. Traffic is then routed from the client device using anonymity routers from the filtered list.

Still further any of the above filtering techniques may be combined sequentially or concurrently.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

In particular, FIGS. 4-6 illustrate embodiments of the filtering step in FIG. 3.

DETAILED DESCRIPTION OF EXAMPLE EMBODIMENTS

Figure 1:
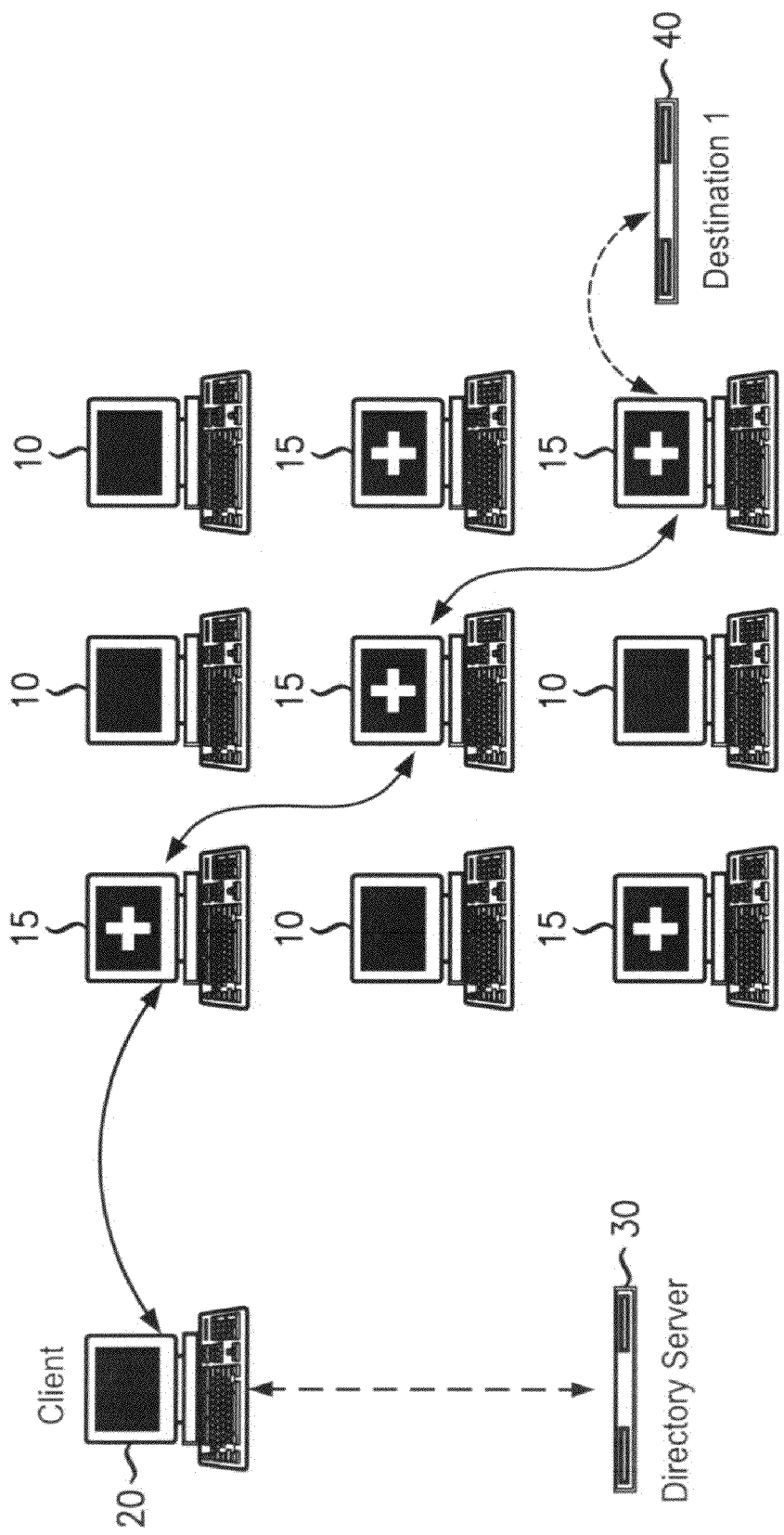
FIG. 1 illustrates an example of a conventional anonymization network.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, for example, those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It is convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, that perform particular tasks or implement particular abstract data types and may be implemented using existing hardware at existing network elements or control nodes (e.g., a database). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible computer readable medium or implemented over some type of transmission medium. The tangible computer readable medium may be magnetic (e.g., a floppy disk or a hard drive) or optical (e.g., a compact disk read only memory, or "CD ROM"), and may be read only or random access. Similarly, the transmission medium may be wireless or wireline such as twisted wire pairs, coaxial cable, optical fiber, or some other suitable transmission medium known to the art. Example embodiments are not limited by these aspects of any given implementation.

Figure 2:
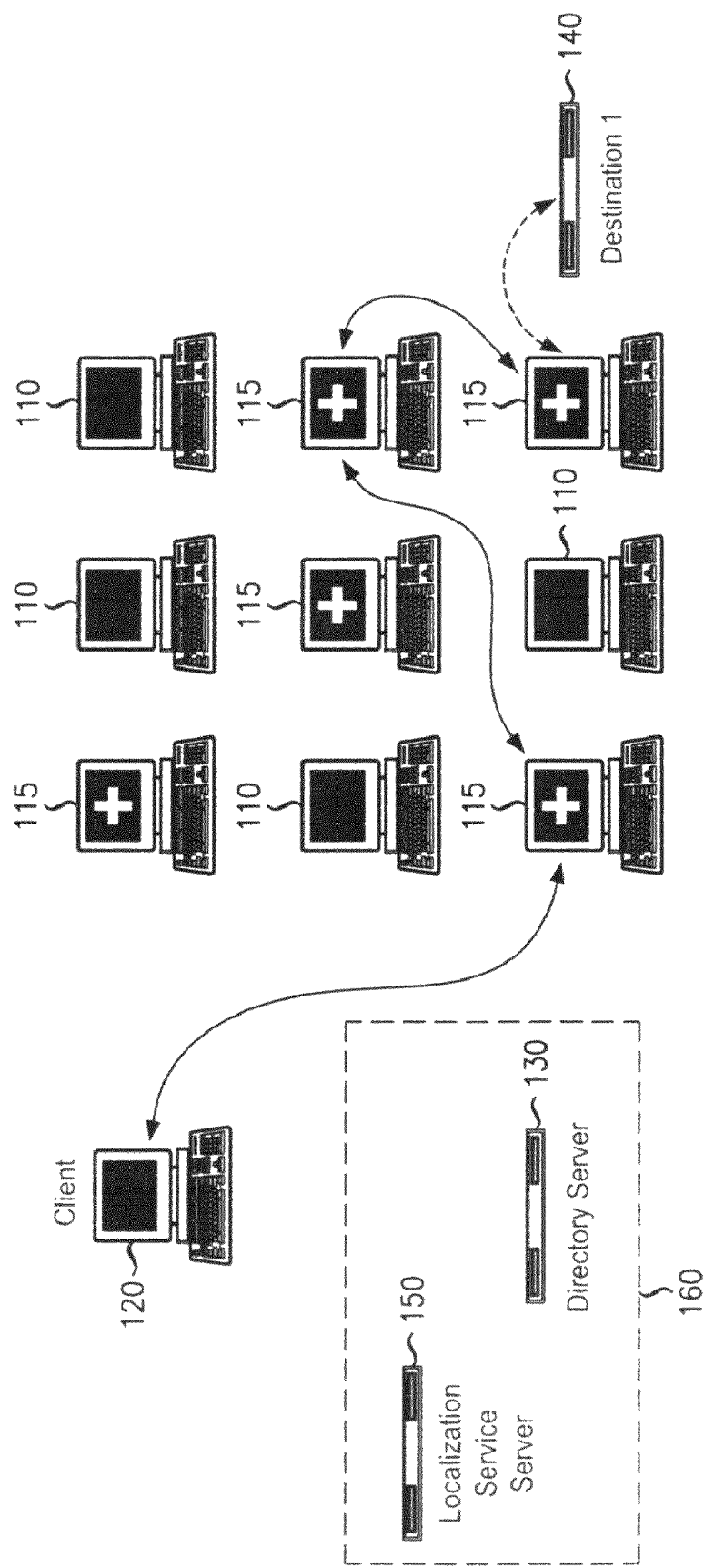
FIG. 2 illustrates an example embodiment of an anonymization network.

FIG. 2 illustrates an example embodiment of an anonymization network. A portion of the Internet including a plurality of routers 110 and 115 is shown. Of the plurality of routers 110 and 115, some of the routers, routers 115, run an anonymization service, and may act as anonymity routers 115 and form an anonymization network. These anonymity routers 115 are illustrated with a plus sign.

Operation of the anonymization network will be described with respect to a client device 120 communicating with a destination device 140 via the anonymization network. This operational description will also involve a localization service server 150. The localization service server 150 may be a well-known application layer traffic optimization (ALTO) style interface run on a server of the service provider of the user device 120. This and other embodiments of the localization service server 150 will be described below.

As further shown in FIG. 2, a service provider 160 may include both the local directory server 130 and the localization service server 150; however, this is merely an option.

Example embodiments of the operation of the anonymization network in FIG. 2 will now be described with respect to FIGS. 3-6.

Figure 3:
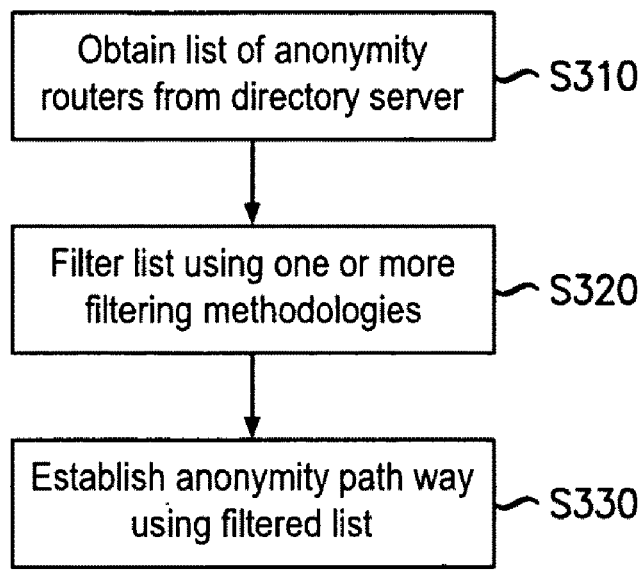
FIGS. 3-6 illustrate flow charts describing example embodiments of the operation of the anonymization network in FIG. 2.

In the embodiment of FIG. 3, the client or user device 120 (hereinafter collectively referred to as the "client 120") running an anonymization client (e.g., software) obtains a list of anonymity routers 115 from a directory server 130 in step S310. The directory server 130 may be a global directory server serving many service providers. Alternatively, the directory service 130 may be a local directory server maintained by the service provider of the user. Here, the service provider periodically updates the local directory server based on updates at the global directory server. This reduces traffic at the global directory server.

Next, in step S320, the obtained list of anonymity routers is filtered. This process will be described in more detail below with respect to FIGS. 4-6. After filtering, the client 120 establishes a pathway to the destination device 140 using the filtered list in step S330. This may be accomplished in the conventional manner, but using the filtered list. Namely, the client 120 builds a path of connections through a plurality of anonymity routers 115. For example, a first anonymity router 115 may be randomly selected from the filtered list, and the client 120 negotiates a set of encryption keys for this hop. A second anonymity router 115 may then randomly selected from the filtered list, and the client 120 negotiates a set of encryption keys for the hop from the first anonymity router 115 to the second anonymity router 115. This process is repeated a number of times to build the pathway or circuit through the anonymization network. The final anonymity router 115 in the pathway is given the address (e.g., URL) of the destination device 140. As shown, traffic sent between the client 120 and the destination device 140 traverses a number of encrypted hops. In FIG. 2, each encrypted hop is shown by a solid double headed arrow, and each unencrypted hop is shown by a dashed double headed arrow.

Figure 4:
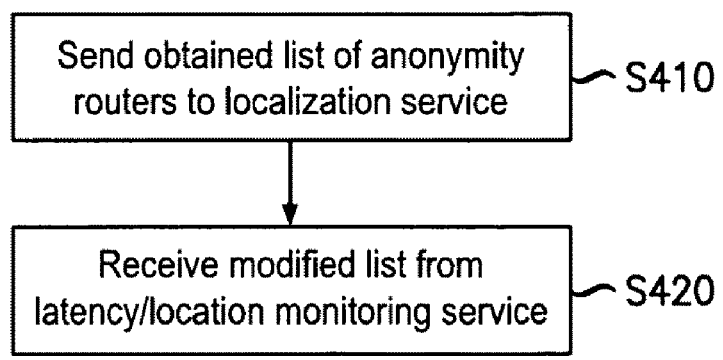

FIG. 4 illustrates one embodiment of the filtering step in FIG. 3. As shown, in step S410, the client 120 sends the obtained list of anonymity routers 115 to the localization service server 150. The localization service server 150 tracks the locations of routers in the network. In one example, the localization service server 150 is resident at the service provider of the user. Here, the service provider selects anonymity servers within the provider's network and/or the networks of the provider's peering partners. These selected anonymity routers will generally be located closer to the client 120 than other anonymity routers. Accordingly, this selection may be thought of as location or distance based. The selected anonymity routers may be returned as the filtered list, and received by the client 120 in step S420.

In particular, the filtered list may be ordered based on distance from the client 120. Alternatively, the list received from the client 120 may be reordered such that the selected anonymity routers 115 appear at the top of the list, and/or in order of distance from the client 120. In this example, the client 120 may limit the anonymity routers 115 selected for routing of traffic to those at the top of the list. Also, if the filtered list is ordered based on distance from the client 120, in the routing step S330, the client 120 may select a number of the anonymity routers 115 in order of closest to farthest such that the closest anonymity routers 115 are selected first.

As another example, localization service server 150 is an ALTO style interface run on a server of the service provider of the user device 120. Here the ALTO interface returns the list of servers order by at least distance from the user. As is known, ALTO may use other factors such as cost in ordering the list of servers. In routing step S330, the client 120 may select the anonymity routers 115 in order such that the closest anonymity routers 115 are selected first.

As a further alternative, when the service provider receives a request for a list of anonymity routers from a client, the service provider may combine the functions of a local directory server and a localization service server. Namely, the service provider obtains the list of anonymity routers from the local directory server, provides that list to the localization service server, and returns the output from the localization service server to the client 120. Accordingly, as shown in FIG. 2, a service provider 160 may include both the local directory server 130 and the localization service server 150. In this manner, the client 120 no longer needs to run a localization service client because this is being handled at the service provider.

In the embodiments of FIGS. 3 and 4, the anonymity routers 115 over which traffic is routed will be those anonymity routers 115 closer to the client 120. As a result, latency may be reduced.

Figure 5:
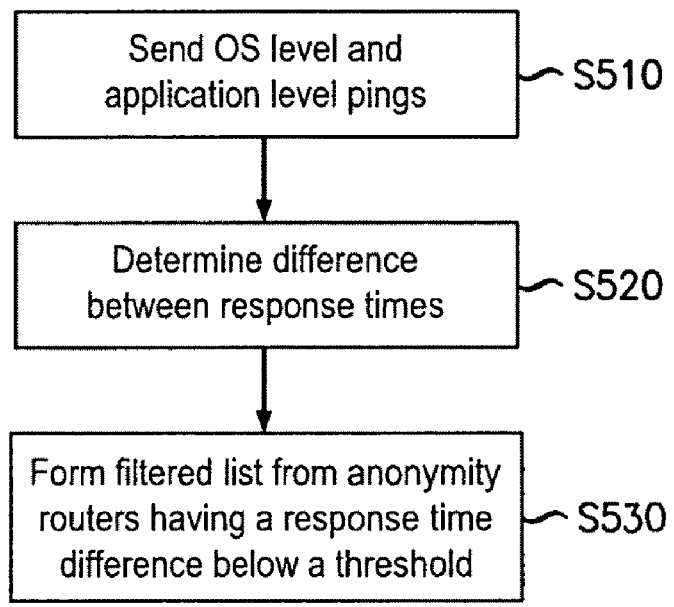

FIG. 5 illustrates another embodiment of the filtering step in FIG. 3. As shown, in step S510 the client 120 sends an operating system level ping and an application layer ping to each of the anonymity routers 115. For example, the operating system level ping may be the well-known Internet Control Message Protocol (ICMP) ping. The application layer ping may be a ping sent from the anonymity application running at the client 120.

At the anonymity routers 115, the operating system level ping will be processed at the kernel, while the application layer ping will be processed by the operating system at the application layer. As a result, while both pings experience the same network delay, the application layer ping becomes queued up by the anonymity software at the anonymity router and is handled in turn at the application layer. Consequently, the application layer ping experiences additional delay based on the loading of the application. The more heavily loaded the anonymity software at the anonymity router 115, the longer the delay in responding to the ping.

In step S520, the client 120 determines the difference in response times between the application layer ping and the operating system ping for each responding anonymity router 115. The client 120 removes (e.g., filters out) those anonymity routers 115 having differences greater than a threshold amount to produce the filtered list. For example, the threshold amount may be established such that that the permissible application layer ping delay is no more than 50% greater than the operating system ping. Accordingly, the client 120 will use less loaded anonymity routers 115 in routing traffic, and latency becomes reduced.

Alternatively, the client 120 orders the anonymity routers 115 from smallest difference to largest difference to create the filtered list. The client 120 may route traffic by randomly selecting anonymity routers 115 from a number of the anonymity routers 115 having the smallest differences, or the client 120 may route traffic by selecting a number of anonymity routers 115 in order of smallest difference to largest difference.

As will be appreciated, instead of the client 120 performing the filtering, the filtering may be performed on behalf of the client 120 at the service provider.

Figure 6:
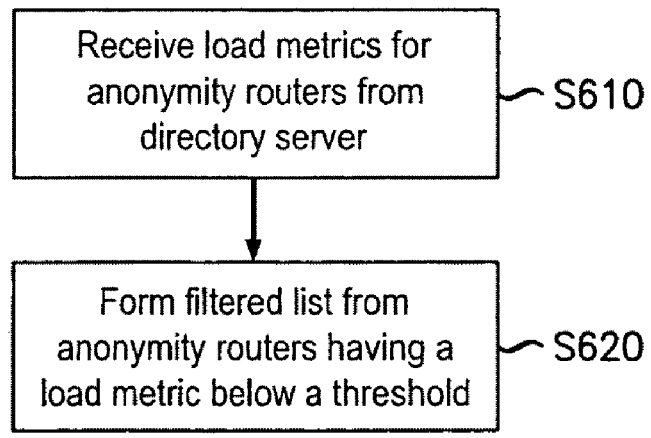

FIG. 6 illustrates a further embodiment of the filtering step in FIG. 3. In this embodiment, anonymity routers 115 respond to the directory server with load information. Namely, as is known, the directory server periodically queries the anonymity routers 115 to determine they are still active and operable. According to this embodiment, in response to this query, the anonymity routers 115 also respond with a load metric. The value of the load metric may be between 0 and 1, inclusive. A value of 1 indicates the anonymity router 115 is heavily loaded, while a value of 0 indicates no load. Load may be based on one or more of resource (e.g., bandwidth, memory, cpu, IO) usage, number of anonymity message in the queue, the number of anonymity paths running, the number of bytes transported on these paths, etc. This load metric information may also be stored at the local directory servers.

As shown in FIG. 6, in step S610, the client 120 receives the load metrics for the anonymity routers 115 from the directory server (global or local). As will be appreciated this may occur concurrently as part of step S310 in FIG. 3. In step S620, the client 120 removes (e.g., filters out) those anonymity routers 115 having a load metric greater than a threshold amount to produce the filtered list. Accordingly, the client 120 will use less loaded anonymity routers 115 in routing traffic, and latency becomes reduced.

Alternatively, the client 120 orders the anonymity routers 115 from smallest load metric to largest load metric to create the filtered list. The client 120 may route traffic by randomly selecting anonymity routers 115 from a number of the anonymity routers 115 having the smallest load metrics, or the client 120 may route traffic by selecting a number of anonymity routers 115 in order of smallest load metric to largest load metric.

As will be appreciated, instead of the client 120 performing the filtering, the filtering may be performed on behalf of the client 120 at the service provider.

One or more of the filter techniques described above may be combined to generate the filtered list. The techniques may be performed consecutively in any order, or concurrently. When performed consecutively, the filtered list of the previous techniques is filtered by the next technique. When run concurrently, the anonymity routers 115 common to each of the filtered lists may form the final filtered list.

The invention being thus described, it will be obvious that the same may be varied in many ways. Such variations are not to be regarded as a departure from the invention, and all such modifications are intended to be included within the scope of the invention.

We claim:

1. A method of decreasing latency in an anonymity network, comprising:
    filtering a list of anonymity routers for a client device based on loads of the anonymity routers on the list, wherein the list includes a load metric indicating a load associated with each anonymity router, the filtering including,
        sending an operating system layer message and an application layer message to a number of the anonymity routers on the list,
        determining, for each of the number of the anonymity routers, a difference between a response time to the operating system layer message and a response time to the application layer message,
        forming a filtered list excluding anonymity routers from the list having associated load metrics greater than a threshold and a determined difference greater than a threshold, and
        routing traffic from the client device using anonymity routers from the filtered list.

2. The method of claim 1, wherein the load metrics range from zero to one inclusive.

3. The method of claim 1, wherein the filtering step filters the list based on both (i) the loads of the anonymity routers on the list and (ii) the distances of the anonymity routers from the client device.

4. The method of claim 3, wherein the filtering step filters based on the loads the anonymity routers on the list and then filters based on the distances of the anonymity routers from the client device.

5. The method of claim 4, further comprising:
    routing traffic from the client device to a destination using a number of anonymity routers as indicated by the filtered list.

6. The method of claim 3, wherein the filtering step concurrently filters the list based on both (i) the loads of the anonymity routers on the list and (ii) the distances of the anonymity routers from the client device to obtain first and second filtered lists, and then forms a final filtered list based on anonymity routers on both the first and second filtered lists.

7. The method of claim 6, further comprising:
    routing traffic from the client device using anonymity routers from the final filtered list.

8. The method of claim 3, wherein the filtering step filters based on the distances of the anonymity routers from the client device and then filters based on the loads the anonymity routers on the list.

9. The method of claim 8, further comprising:
    routing traffic from the client device to a destination using a number of anonymity routers as indicated by the filtered list.

10. A method of decreasing latency in an anonymity network, comprising:
    filtering a list of anonymity routers for a client device based on loads of the anonymity routers on the list, the filtering including,
        sending an operating system layer message and an application layer message to a number of the anonymity routers on the obtained list, the application layer message from an anonymity application;
        determining, for each of the number of the anonymity routers, a difference between a response time to the operating system layer message and a response time to the application layer message;
        forming a first filtered list excluding anonymity routers from the list having a determined difference greater than a first threshold;
        forming a second filtered list excluding anonymity routers from the list with associated load metrics greater a second threshold, the list including a load metric associated with each anonymity router; and
        forming a final filtered list based on anonymity routers on both the first and second filtered lists.

11. The method of claim 10, further comprising:
    routing traffic from the client device using anonymity routers from the final filtered list.

* * * * *